United States Patent [19]

Christopher et al.

[11] Patent Number: 5,619,276
[45] Date of Patent: Apr. 8, 1997

[54] ADJUSTABLE VIDEO/RASTER PHASING FOR HORIZONTAL DEFLECTION SYSTEM

[75] Inventors: Todd J. Christopher; Ronald T. Keen, both of Indianapolis, Ind.

[73] Assignee: Thomson Consumer Electronics, Inc., Indianapolis, Ind.

[21] Appl. No.: 41,291

[22] Filed: Mar. 29, 1993

Related U.S. Application Data

[63] Continuation of Ser. No. 499,226, Mar. 26, 1990, abandoned.

[51] Int. Cl.$^6$ .................................................. H04N 5/04
[52] U.S. Cl. .................................................. 348/541
[58] Field of Search ........................... 358/11, 140, 148, 358/149, 150, 158, 181, 159; 348/540, 537, 536, 541; H04N 5/04

[56] References Cited

U.S. PATENT DOCUMENTS

| | | | |
|---|---|---|---|
| 3,891,800 | 6/1975 | Janssen et al. | 178/69.5 |
| 4,317,133 | 2/1982 | Fernsler et al. | 358/158 |
| 4,425,581 | 1/1984 | Schweppe et al. | 358/149 |
| 4,591,910 | 5/1986 | Lai et al. | 358/148 |
| 4,611,229 | 9/1986 | Srivastava et al. | 358/148 |

(List continued on next page.)

FOREIGN PATENT DOCUMENTS

| | | | |
|---|---|---|---|
| 0353725 | 2/1990 | European Pat. Off. | |
| 60-96965 | 5/1985 | Japan . | |
| 0096965 | 5/1985 | Japan | 358/148 |
| 0216588 | 9/1987 | Japan | 358/158 |
| 2-58090 | 2/1990 | Japan . | |
| 0058090 | 2/1990 | Japan | 358/148 |
| 2085257 | 4/1982 | United Kingdom | 358/158 |

OTHER PUBLICATIONS

Multi Scanning TV Processor IC, Berland, et al., IEEE 1989 International Conference on Consumer Electronics, Digest of Technical Papers, Jun. 6–9, 1989 (CH2724–3/89/0000–0312), pp. 312–323.

Multi Scanning TV Processor IC, Berland et al., IEEE Transactions on Consumer Electronics, vol. 35, No. 3, Aug. 1989 (0098 3063/89/0200 0315), pp. 315–318.

(List continued on next page.)

*Primary Examiner*—David E. Harvey
*Attorney, Agent, or Firm*—Joseph J. Laks; Harvey D. Fried

[57] ABSTRACT

Adjustment and maintenance of a phase relationship between a video signal and a scan synchronizing signal to assure proper horizontal centering is provided in a horizontal deflection system. A first phase locked loop generates a first timing signal at a first frequency, synchronously with a horizontal synchronizing component in a video signal. A presettable counting circuit operates synchronously with the first timing signal for dividing a clock signal to generate a second timing signal at a second frequency. A second phase locked loop generates a scan synchronizing signal from the second timing signal. A microprocessor may supply different numbers to a register, the output of the register being coupled to the presettable counting circuit. Different numbers change the relative phase between the first and second timing signals by incremental steps. The microprocessor monitors a video source selection switch to gate one of alternative video sources as a video and synchronizing signal output and adjusts the relative phase between the horizontal synchronizing component of the selected video source and a synchronous timing signal by a factor appropriate for the selected video source. A manually operable circuit may be coupled in a feedback path of the second phase locked loop for adjusting the relative phase between the second timing signal and the scan synchronizing signal, over a range corresponding to an incremental step.

33 Claims, 8 Drawing Sheets

U.S. PATENT DOCUMENTS

| | | | |
|---|---|---|---|
| 4,611,230 | 9/1986 | Nienaber | 358/158 |
| 4,686,567 | 8/1987 | Burdick | 358/148 |
| 4,730,216 | 3/1988 | Casey et al. | 358/140 |
| 4,739,403 | 4/1988 | Mark | 358/148 |
| 4,769,705 | 9/1988 | Lendaro | 358/158 |
| 4,991,023 | 2/1991 | Nicals | 358/242 |
| 4,996,596 | 2/1991 | Hirao et al. | 358/158 |
| 5,019,907 | 5/1991 | Murakoshi et al. | 358/158 |

OTHER PUBLICATIONS

DPU 2532 Deflection Processor Unit–Part of ITT "Digital Chip Set" pp. 47–72 of larger publication, title and date unknown, but believed to predate reference AS cited below.

DPU 2553, DPU 2554, DPU 2555 Deflection Processors, pp. 23–24 ITT Semiconductors, Lawrence MA, Edition 1987/89, Order No. 6251–302–1/E.

Copy of commonly owned, concurrently filed U. S. Application Serial No. 499,249.

Search Report from counterpart application in Turkey, dated Apr. 26, 1993.

ADJUSTABLE VIDEO/RASTER PHASING FOR HORIZONTAL DEFLECTION SYSTEM

This is a continuation of application Ser. No. 07/499,226 filed Mar. 26, 1990 now abandoned.

This invention relates to the field of horizontal deflection circuits for televisions apparatus. More particularly, this invention relates to a system for providing a remotely adjustable phase relationship between an incoming video signal and the synchronizing signal used by the horizontal deflection circuit to assure horizontal centering.

Television apparatus require that the circuits generating the raster scan be synchronized with the video signal being displayed. Standard NTSC video signals, for example, are displayed by interlacing successive fields, each field being generated by a raster scanning operation at a basic or standard horizontal scanning rate of approximately 15,734 Hz.

The basic scanning rate for video signals is variously referred to as $f_H$, $1f_H$, and 1H. The actual frequency of a $1f_H$ signal will vary according to different video standards. In accordance with efforts to improve the picture quality of television apparatus, systems have been developed for displaying video signals progressively, in a noninterlaced fashion. Progressive scanning requires that each displayed frame must be scanned in the same time period allotted for scanning one of the two fields of the interlaced format. Accordingly, the horizontal scanning frequency must be twice that of the interlaced video signals. The scanning rate for such progressively scanned displays is variously referred to as $2f_H$ and 2H. A $2f_H$ scanning frequency according to standards in the United States, for example, is approximately 31,468 Hz. An unspecified multiple rate may be referred to, for example, as $nf_H$ where n is an integer.

A problem that is encountered in sophisticated video processing and deflection systems is the additional time which is often necessary for the special signal processing of the video information. The time delays resulting from the additional signal processing can cause problems in synchronizing the deflection circuit with the incoming video signal. Problems in properly synchronizing the video/raster phasing can result in the picture being uncentered horizontally. Typically, the video information is received by the television apparatus one line at a time, at a first horizontal scanning rate, for example $1f_H$. In a progressive scanning system, for example, the video information may be stored, one or more lines at a time, prior to being displayed. Sometimes, each line is read out, or displayed, more than once. Sometimes, the information in successive lines, or sets of lines, is processed, for example, by being combined by interpolation. This can result in additional lines of video information, which must be displayed along with the information in the original video signal. In a bidirectional scanning system, for example, the video information for alternate lines must be read out, or displayed, in reverse. In each case, the $nf_H$ multiple rate synchronizing signals, $2f_H$ for the example chosen, must be delayed long enough the accommodate the signal processing.

It is desirable that circuits be standardized, which enables some circuits to be shared by a number of different television apparatus, which are otherwise provided with different signal processing capabilities and systems. Some receivers can operate in multiple modes, or process video signals from two or more alternative sources, which may require more or less signal processing time, and therefore require adjustable video/raster phasing. Television apparatus, particularly those employing sophisticated signal processing, have a substantial need for easily controlling video/raster phasing, that is, the delay between synchronizing components in received video signals and scan synchronizing signals generated for processed video signals. The processed video signals are often displayed at faster scanning rates, for example, requiring a video/raster phase adjustment for the delay between a $1f_H$ video signal in interlaced format and the $2f_H$ scan synchronizing signal required for a progressive horizontal scanning deflection system.

It is an aspect of the invention to provide a means for easily adjusting and maintaining the relative phase of synchronizing or timing signals having different frequencies. A divider circuit may be employed to generate a higher rate $nf_H$ timing signal, for example $2f_H$, from a clock signal. The divider circuit may be synchronized with the timing signal, for example $1f_H$, generated by a first phase locked loop to periodically reset the divider. Such a divider may be embodied as a digital divider which can be preloaded with a digital number, for example a four bit digital number, by digital control signals. Such digital control signals may be transmitted over a serial bus, as is found in many digitally controlled television apparatus. A presettable or preloadable divider circuit can provide coarse video/raster phasing in accordance with the preloaded digital number to control centering of the picture. Changing the preloaded number will move the second timing signal relative to the incoming video signal in steps, for example two microsecond steps. A presettable or preloadable divide by 16 circuit operating from a $32f_H$ clock, for example, can provide a $2f_H$ timing signal.

It is another aspect of the invention to provide for automatically controlled video/raster phase adjustment for alternative video sources having inherently different timing characteristics. Such alternative sources may include RGB inputs and computer video driving circuits. Selection of an alternative video source, for example by means of a remote control keypad, is detected by remote receiver. The remote receiver is monitored by a microprocessor which controls the television apparatus. The microprocessor sends control data to a video source selector to switch an alternative video source as the video output of the signal processing circuitry. The microprocessor also transmits control data to a video/raster phase adjustment circuit, to compensate for a different timing characteristic of the alternative video source, to assure that the picture will be properly centered.

It is still another aspect of the invention to provide manually controlled fine phasing adjustment, for example in the range of zero to two microseconds, in conjunction with the bus controlled phase adjustment. In accordance with this aspect of the invention, the fine phase adjustment may be implemented at a different point in the successive chain of synchronizing and timing signals than the point at which the bus controlled delay is implemented. The fine phase adjustment may be inserted in the second phase locked loop, rather than in the converter. The delay is made with respect to the second timing signal, rather than with respect to the first timing signal. In an illustrative embodiment, retrace pulses at the second frequency are an input to a sawtooth signal circuit. The sawtooth signal is one input to the phase comparator of the second phase locked loop. The sawtooth circuit includes a ramp capacitor. Varying the current used to charge the ramp capacitor in the sawtooth signal circuit, for example by means of a manually adjustable potentiometer, provides a fine phase adjustment.

Another problem that may be encountered in generating a second horizontal synchronizing signal, for example at $2f_H$, from a first horizontal synchronizing signal, for example at $1f_H$, in a video signal, is assuring sufficiently precise symmetry, or constancy, of the second synchronizing signal within the period of the first synchronizing signal. The period of the second signal may vary due is to jitter caused by the first signal. If the symmetry of a $2f_H$ synchronizing signal, for example, is not very precise within any $1f_H$ period, for example, the $2f_H$ trace will be initiated at a different instant every other line in the raster. This can cause a split raster effect, as shown for example in FIG. 5. A raster 2 has a first set of alternate scan lines forming a picture portion R which diverges to the right and a second set of alternate scan lines forming a picture portion L which diverges to the left. Adjacent retrace pulses are of different amplitude because different peak to peak yoke currents flow during adjacent trace periods. Different peak to peak yoke currents flow during adjacent trace periods because adjacent trace periods are of different length. The amount of the scanning difference between adjacent lines will depend on the magnitude of the period difference and the overall energy recovery efficiency of the deflection circuit. The effect of raster splitting is exaggerated in FIG. 5, wherein the scan lines of portion L begin sooner than the scan lines of portion R. However, time differences between adjacent trace periods on the order of only 100 nanoseconds may cause unacceptable amounts of raster splitting.

An asymmetry in the first synchronizing signal, for example at $1f_H$, can be introduced by the very nature of the phase locked loops used in the synchronizing circuits of horizontal deflection systems having two phase locked loops and forming part of a video speedup system. The asymmetry might be inherent in some integrated circuits as well. The absence of a retrace signal from which to derive a feedback signal for the first phase locked loop, for example at the $1f_H$ frequency, requires that the first timing signal be used as a feedback signal to the phase comparator in the phase locked loop. This can introduce a ripple at the frequency of the first timing signal, resulting in the asymmetry of the first timing signal. The asymmetry has been corrected in the past, for example, by special signal processing circuits associated with operation of the first phase locked loop and/or the circuit used for converting the first timing signal to a second timing or synchronizing signal, at a multiple frequency of the first timing signal. These can be costly, and can result in unwanted delays in propagating synchronizing information through the deflection circuitry.

In commonly owned and copending application Ser. No. 499,249 a horizontal deflection system is described having accurate synchronizing circuits for use in displaying video signals at a multiple scanning rate, where an asymmetry stems from a periodic perturbation of a synchronizing or timing signal. There, a first phase locked loop generates a first timing signal at a first horizontal synchronizing frequency corresponding to a horizontal synchronizing component in a video signal. A converter circuit derives from the first timing signal a second timing signal, having a second frequency at a multiple of the first frequency and subject to a variation in frequency at a rate corresponding to the first frequency. A second phase locked loop receives the second timing signal and a feedback signal in accordance with the second frequency, and includes a voltage controlled oscillator for generating a smooth horizontal synchronizing signal at the second frequency. The second phase locked loop has a characteristic loop response preventing the voltage controlled oscillator from changing frequency as fast as the rate of variation of the second timing signal. A horizontal output deflection stage may be coupled to the second phase locked loop for synchronized horizontal scanning in accordance with the second frequency. The two phase locked loops are configured in tandem, in conjunction with the signal rate converter, or multiplier. No additional signal processing circuitry is needed to correct the symmetry of the timing signal generated by the first phase locked loop or the symmetry of the multiple rate timing signal derived by the converter.

It is yet another aspect of the invention taught herein to provide for easily adjusting and maintaining a phase relationship between received video signals and higher rate synchronizing or timing signals generated by a horizontal deflection circuit which is compatible with the jitter control system described in related and copending application Ser. No. 499,249. The output of the divider, for example, may be treated and processed as an uncorrected timing signal, whose frequency variations will be averaged out by the second phase locked loop, as described above.

FIGS. 4(a), 4(b), 4(c) and 4(d) are waveforms useful for explaining the bus controlled phase adjustment and manually controlled phase adjustment.

Figure 5:
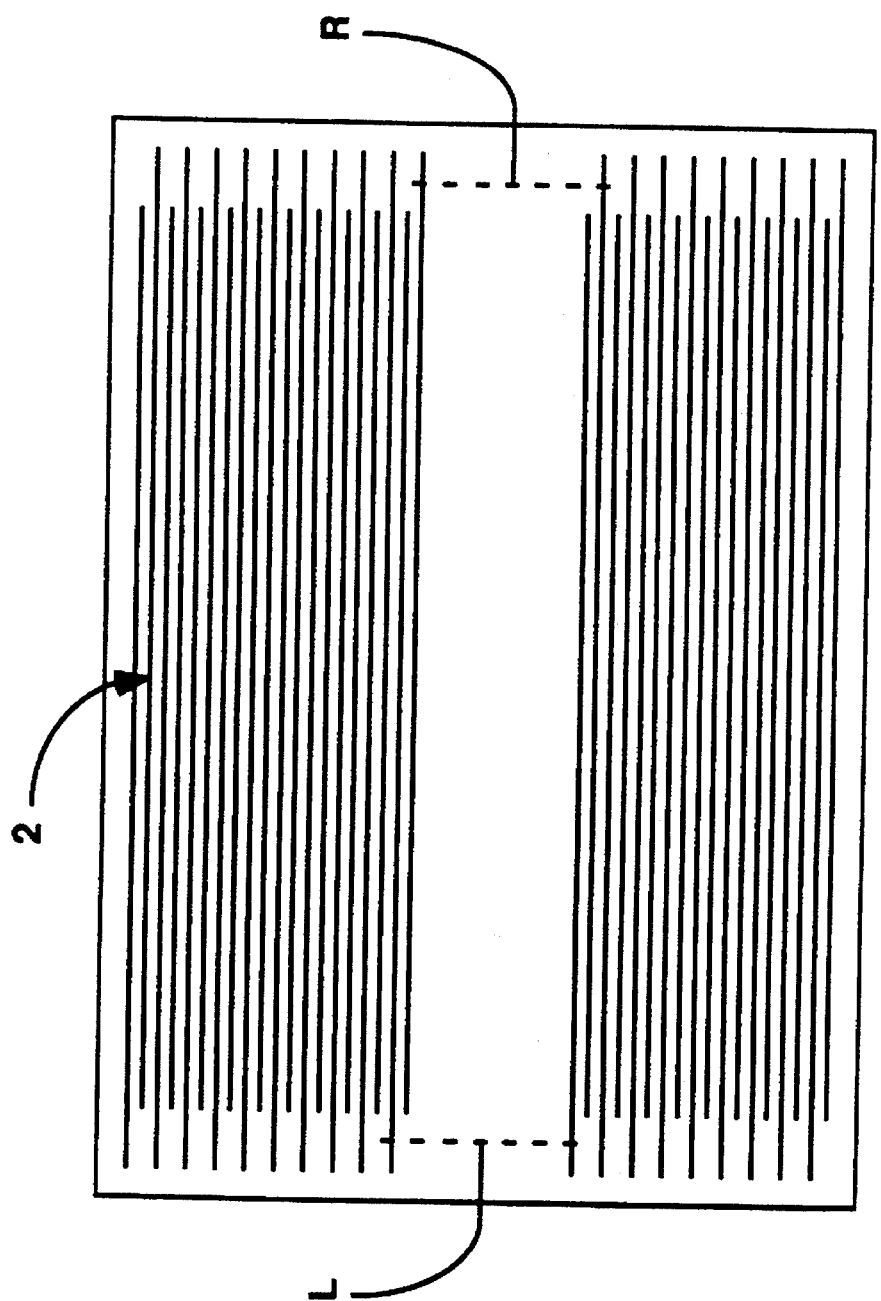

FIG. 5 is a diagram illustrating raster splitting due to asymmetry of the $2f_H$ synchronizing signal within the period of the $1f_H$ synchronizing signal.

FIGS. 6(a), 6(b), 6(c), 6(d), 6(e) and 6(f) are waveforms useful in explaining the raster splitting shown in FIG. 5

Figure 7:
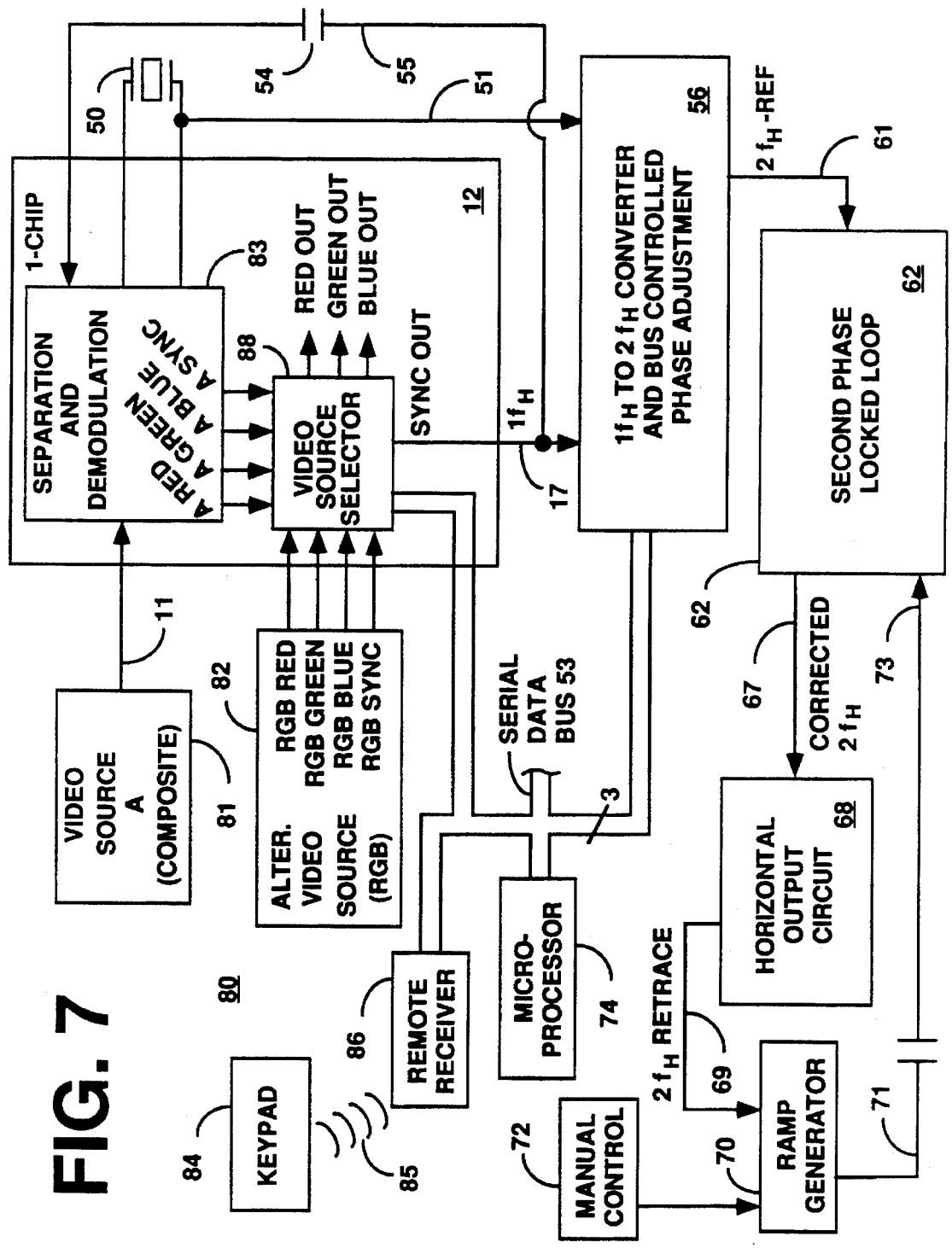

FIG. 7 is a block diagram useful for explaining the interaction of a microprocessor, alternative video sources and a bus controlled video/raster phasing adjustment system.

Figure 1:
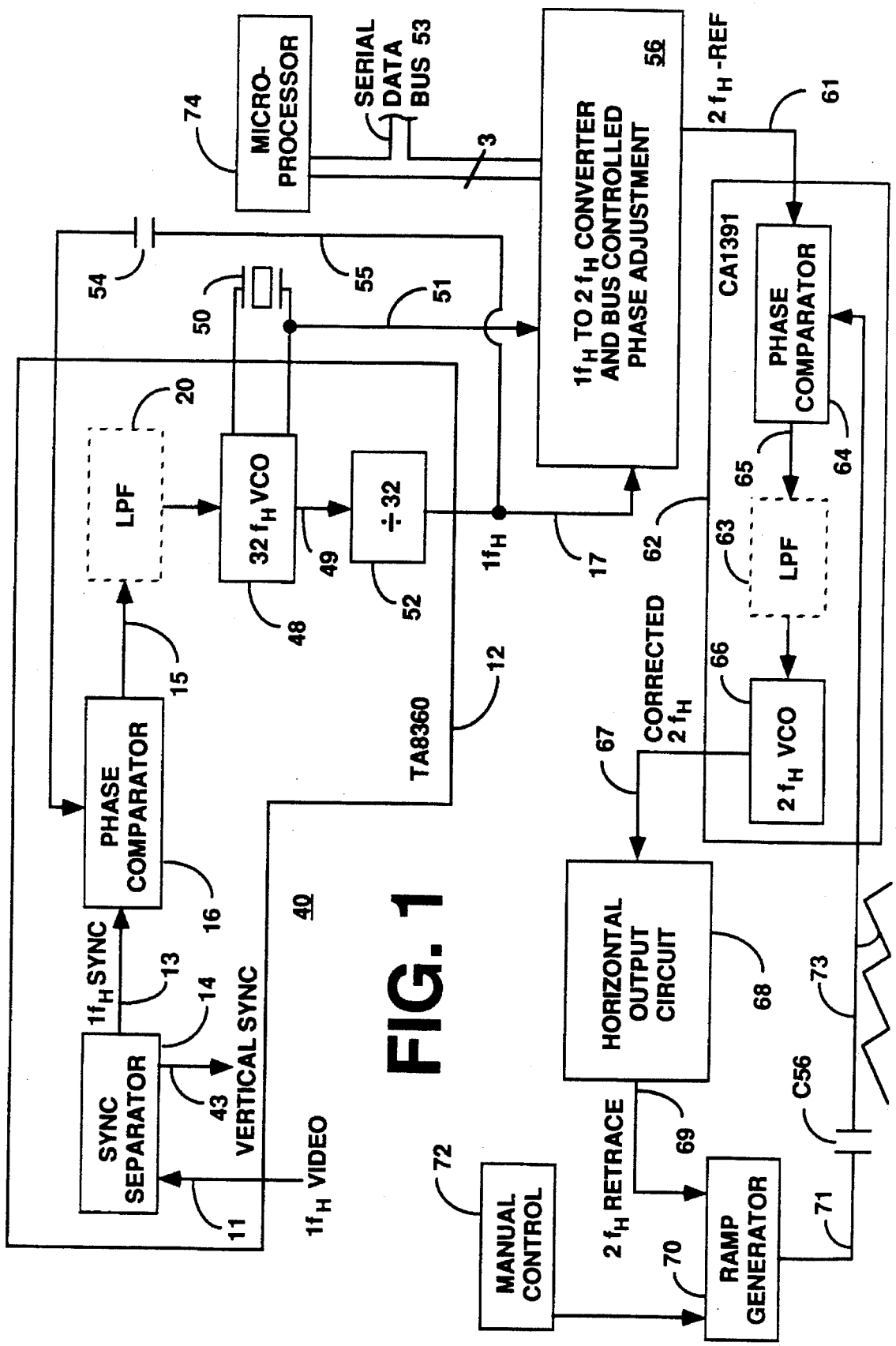
FIG. 1 is a block diagram of a horizontal deflection system including synchronizing circuits for generating timing signals to display $1f_H$ video signals at a $2f_H$ horizontal scanning rate, and providing bus controlled phase adjustment and manually controlled phase adjustment according to this invention.
Figure 6:
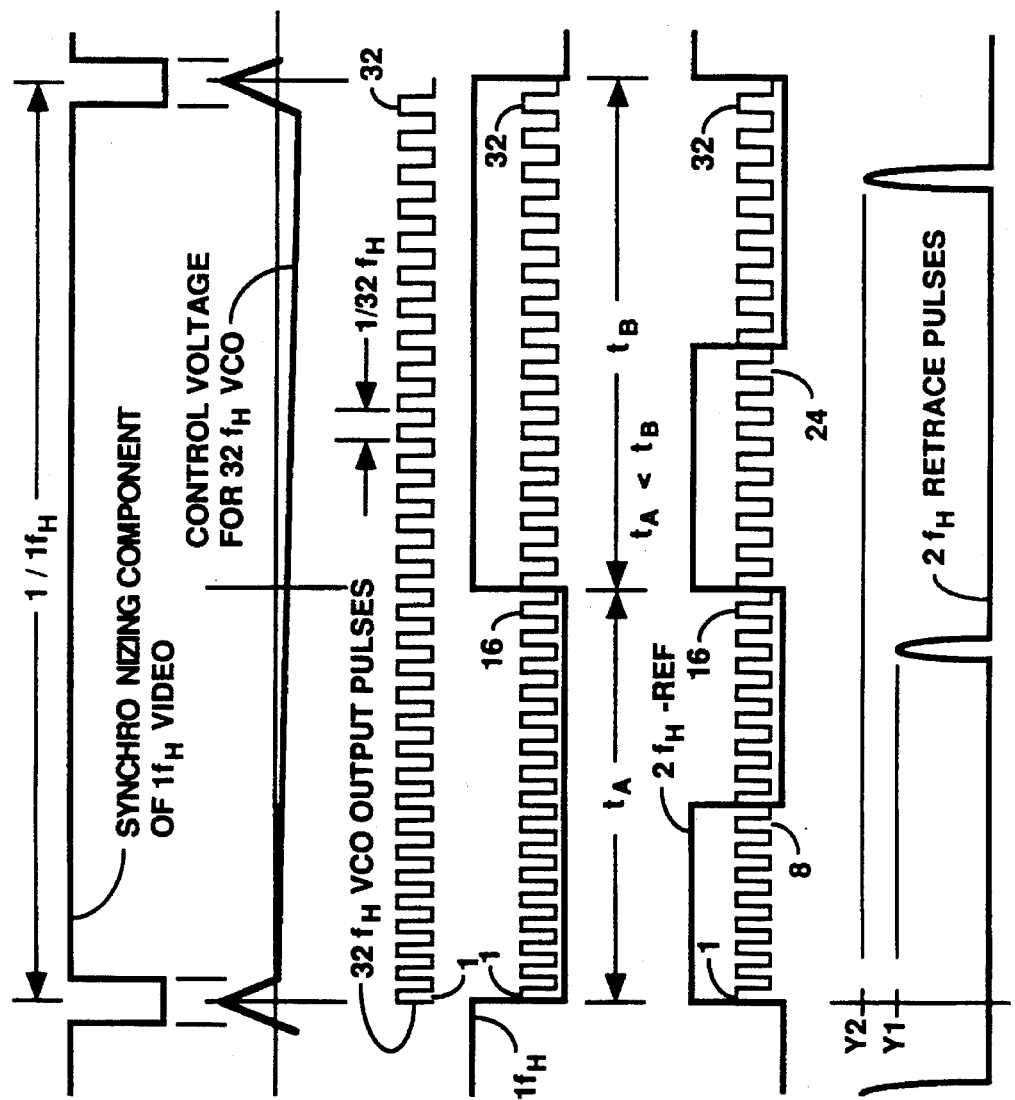

A horizontal deflection system for providing $2f_H$ progressive scanning of a $1f_H$ video signal is shown in block diagram form in FIG. 1, and generally designated by reference numeral 40. A 1-chip 12 may be utilized for constructing the a phase locked loop, which generates a first timing signal as an output, at a nominal $1f_H$ rate. Industry type TA8360, for example, is 1-chip incorporating a sync separator 14, a phase comparator 16 and a voltage controlled oscillator 48. A $1f_H$ video signal on line 11 is an input to sync separator 14. The sync separator 14 provides vertical synchronizing pulses on line 43 and $1f_H$ horizontal synchronizing pulses on line 13. The $1f_H$ synchronizing signals on line 13, shown in FIG. 6(a), are an input to phase comparator 16. The output of phase comparator 16 on line 15, shown in FIG. 6(b), is an error control signal input to low pass filter 20. The frequency characteristic of the low pass filter in the TA8360, for example, is determined primarily by external timing components. Accordingly, block 20 is shown by dashed lines. The external elements may be a series R-C network, having a 10 microfarad capacitor and a 3K resistor coupled between the capacitor and ground. Voltage controlled oscillator 48 operates at a $32f_H$ rate, responsive to a ceramic or L-C resonant circuit 50. A nominal $32f_H$ timing signal on line 49, shown in FIG. 6(c), is an input to a divide by 32 circuit 52. The output of the divide by 32 circuit on line 17 is a 1 $f_H$ drive signal, shown in FIG. 6(d). The $1f_H$ signal is an input on line 55 to the other input of phase comparator 16, which can result in the error control voltage of FIG. 6(b) being adversely modified by a $1f_H$ ripple as shown. In the event the width of the $1f_H$ pulses being fed back to the phase comparator 16 are too wide, the pulse width can be reduced, for example by series coupled capacitor 54. The output of the resonant circuit 50 at $32f_H$ is also available externally of the 1-chip, on line 51.

A $1f_H$ to $2f_H$ converter and bus controlled phase adjustment circuit 56 is coupled to the $1f_H$ output timing signal of the first phase locked loop by line 17 and to the resonant circuit 50 by line 51. Circuit 56 generates a timing signal designated $2f_H$-REF as an output on line 61. The phase of the $2f_H$-REF signal relative to the $1f_H$ timing signal on line 17 can be adjusted responsive to control signals transmitted over serial data bus 53, for example by a microprocessor 74.

Figure 2A:
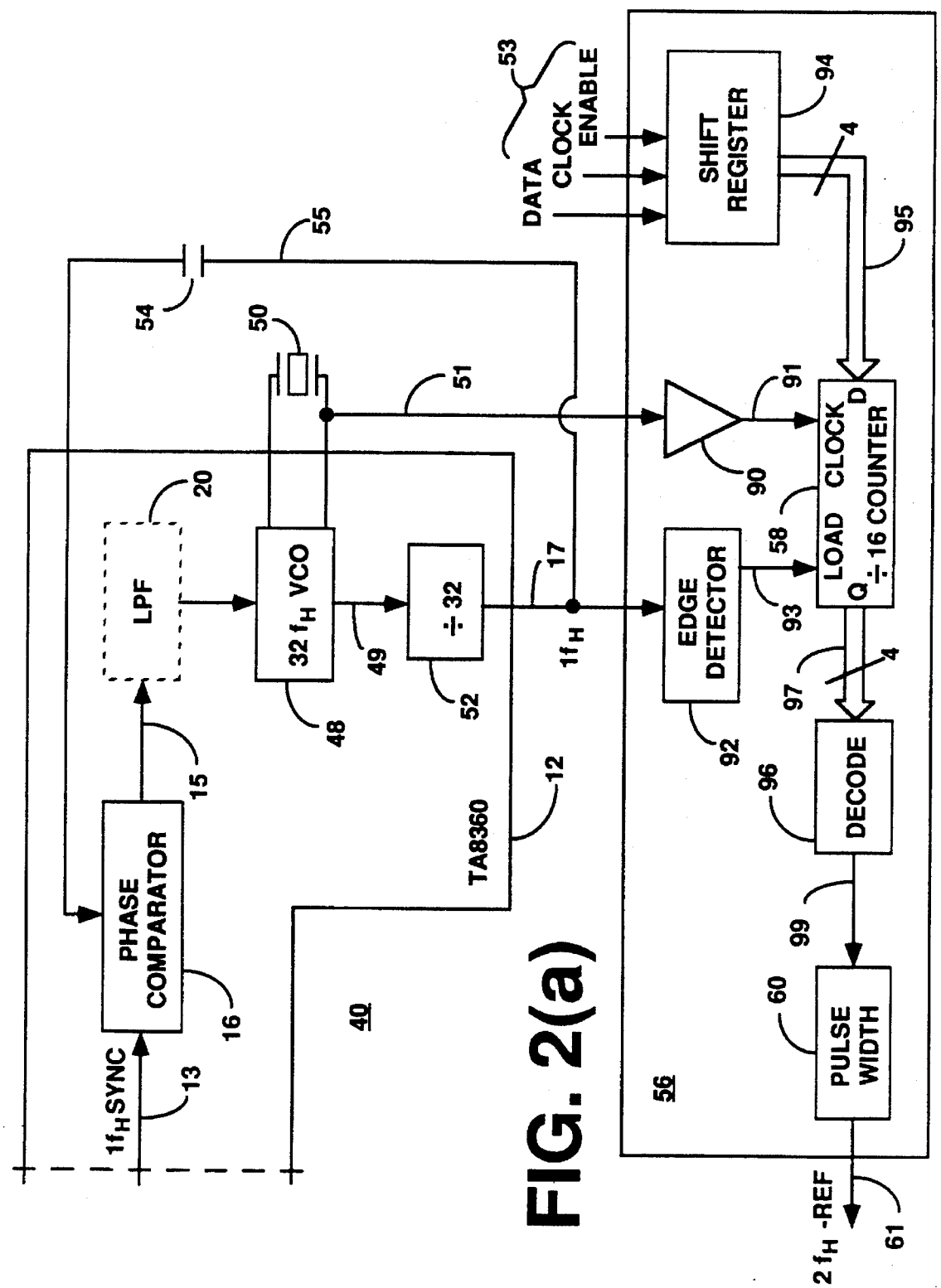
FIG. 2(a) is a block diagram illustrating the $1f_H$ to $2f_H$ converter and bus controlled phase adjustment of FIG. 1 in more detail.

Circuit 56 is shown in more detail in FIG. 2(a). The $32f_H$ output of resonant circuit 50 on line 51 is an input to amplifier 90. The output of amplifier 90 on line 91 is a CLOCK input to divide by 16 counter 58. Dividing a $32f_H$ signal by 16 results in a $2f_H$ signal. Other multiples of a basic horizontal scanning frequency can be produced by utilizing appropriate combinations of clock frequencies and division factors. The $1f_H$ timing signal on line 17 is an input to edge detector 92. Edge detector 92 will detect the leading edges, for example, of the pulses in the $1f_H$ timing signal. The output of the edge detector 92 on line 93 is the LOAD input to counter 58. The divide by 16 counter 58 can be a 4-bit counter, having a 4-bit parallel data bus 95 at its D or starting number input.

In accordance with another aspect of the invention, the use of such counting means is compatible with the jitter control system disclosed in commonly owned and copending application Ser. No. 499,249. A counting/dividing means, similar but without presetting, is used in one embodiment thereof to generate a $2f_H$ timing signal from a $32f_H$ clock signal. The $2f_H$ signal is synchronized with the horizontal synchronizing component of a video signal by a $1f_H$ timing signal synchronized with the synchronizing component.

Remote control may be effected, for example, by means of the serial control bus 53, of the kind which is often provided in those television apparatus having a digital control architecture. A serial data bus may comprise three lines as shown, generally denoted DATA, CLOCK and ENABLE. A number from which to start counting may be stored in shift register 94, by information supplied over the serial data bus 53 by microprocessor 74. The control bus 53 can provide a starting number for the divide by 16 counter 58 to use at each occurrence of a pulse in the $1f_H$ signal on line 17. The output Q of counter 58 is a 4-bit signal on parallel data bus 97. The 4-bit signal is an input to decode circuit 96, which supplies an output pulse on line 99, for example at each occurrence of count 16. Each starting number provides a different and corresponding number of incremental, or coarse, phase adjustment delays. The signal on line 99 is an input to pulse width circuit 60, the output of which on line 61 is the $2f_H$-REF signal. Pulse width circuit 60 assures that the width of the pulses in the uncorrected $2f_H$-REF timing signal on line 61 will be wide enough to assure proper operation of phase comparator in the second phase locked loop.

Figure 2B:
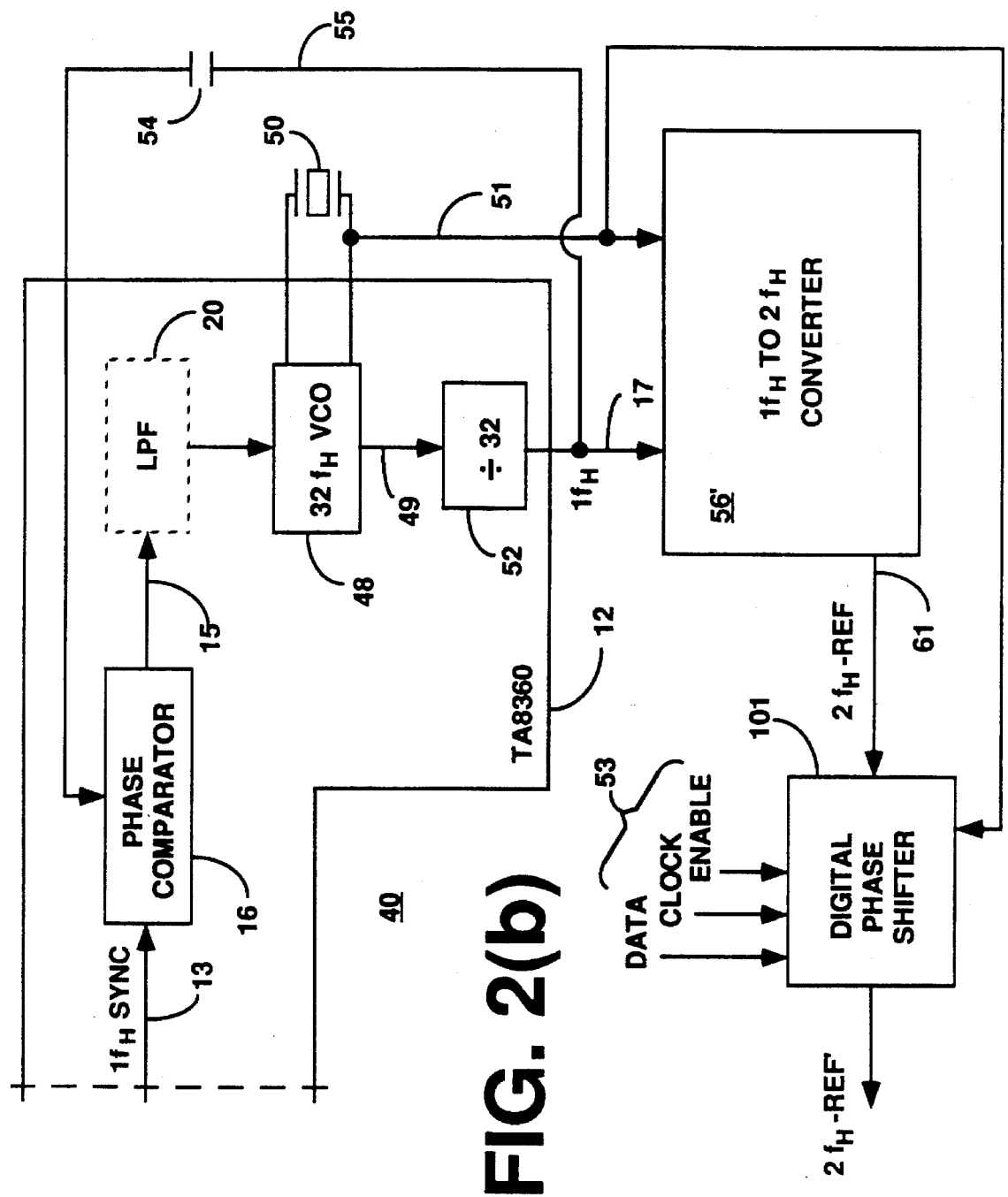
FIG. 2(b) is a block diagram illustrating an alternative bus controlled phase adjustment, utilizing a digital phase shifter.

Alternatively, the adjustable delay may be implemented by a digital phase shifter, as shown in FIG. 2(b). The $1f_H$ to $2f_H$ converter 56' is the same as in block 56 in FIG. 2(a), except that the counter 58 is not presettable and the shift register 94 is omitted. The $2f_H$-REF signal on line 61 is an input to a digital phase shifter 101. The amount of phase delay provided by the phase shifter is determined by control signals transmitted over the data bus 53 by the microprocessor. Line 51 also supplies the $32f_H$ clock signal to the digital phase shifter. If the digital phase shifter does not have an input storage buffer adapted for receiving serial data, a register similar to shift register 94 may be used for that purpose, as in block 56 in FIG. 2(a). The output of the phase shifter 101 is a phase adjusted signal $2f_H$-REF', which for example becomes the input to the second phase locked loop shown in block 62 of FIG. 1.

The $2f_H$-REF signal is symmetrical only to the extent that the initial duty cycle of the $1f_H$ signal is fifty percent. The effect of the $1f_H$ ripple on the error control voltage for the $32f_H$ VCO is reflected in the waveform of FIG. 6(b). The error control voltage periodically falls during each $1f_H$ period. Accordingly, the output frequency $f_{VCO}$ of the $32f_H$ VCO falls periodically, during each $1f_H$ period. As the frequency falls, each subsequent output pulse from the $32f_H$ VCO has a lower frequency. As the frequency decreases, the pulse width $1/f_{VCO}$ increases. The divider circuit 58 doubles the frequency of the $1f_H$ signal, which has a period of 32 output pulses of the $32f_H$ VCO, by dividing the period in half, that is, into two sixteen pulse periods. However, due to the periodically increasing pulse widths, the aggregate width of the first sixteen pulses, $t_A$, is less than the aggregate width of the next sixteen pulses, $t_B$. When the duration of $t_A$ is not equal to the duration of $t_B$, the $2f_H$-REF timing signal is not symmetric within the period of the $1f_H$ signal, notwithstanding the precision of the digital divider. This asymmetry can cause retrace pulses of alternating amplitudes Y1 and Y2 as shown in FIG. 6(f), which can result in the raster splitting. The $2f_H$-REF signal generated by the digital circuit must therefore also be treated as an uncorrected signal, which requires further processing.

Figure 3:
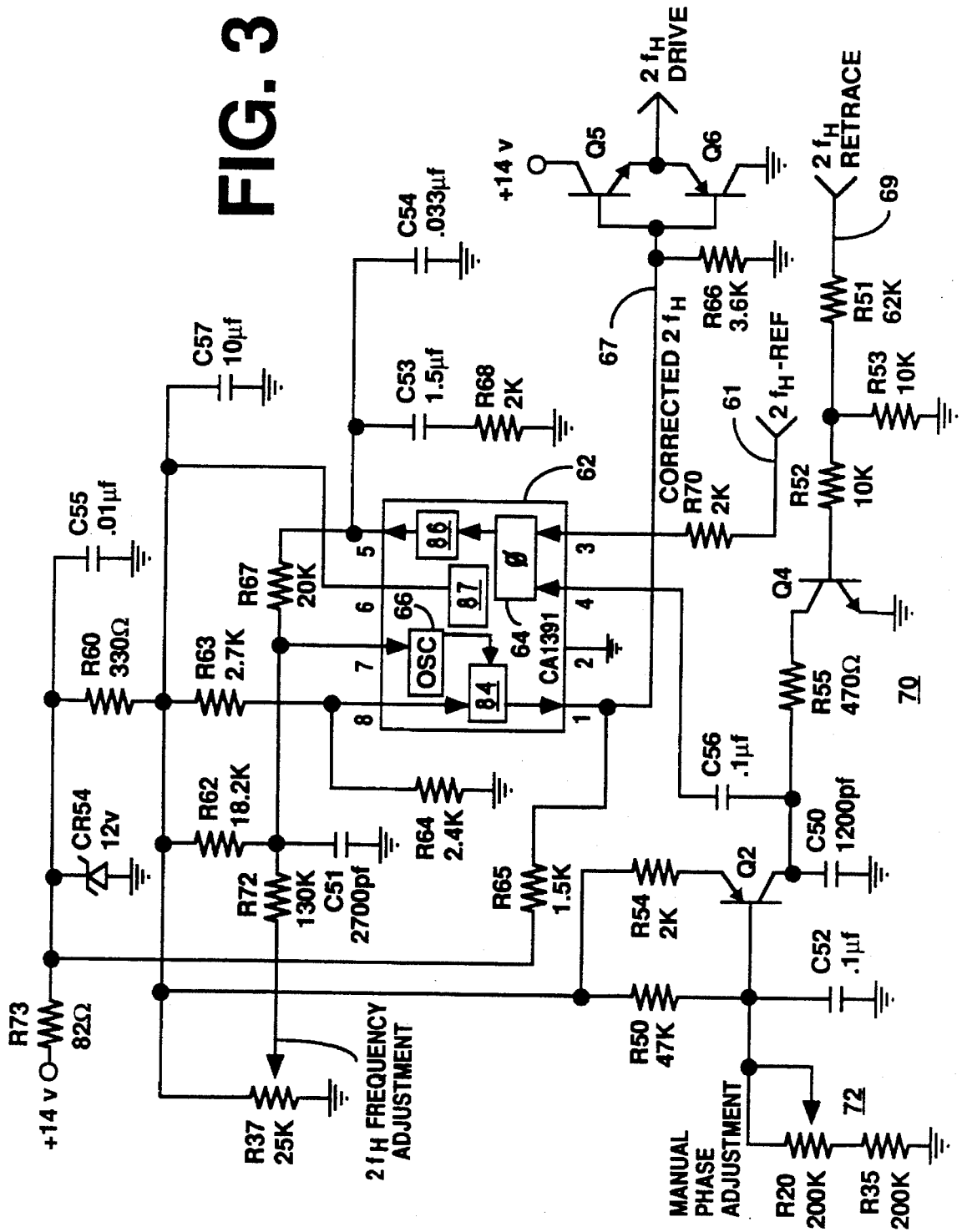
FIG. 3 is a circuit diagram showing the second phase locked loop of FIG. 1 in more detail, including the manually controlled phase adjustment.

The $2f_H$-REF signal is further processed by a second phase locked loop 62. The second phase locked loop comprises phase comparator 64, low pass filter 63 and a voltage controlled oscillator 66. The phase locked loop 62 is embodied as an industry type CA1391. The error output signal of phase comparator 64 on line 65 is a control input to voltage controlled oscillator 66, which operates at a $2f_H$ rate. The operating frequency of the oscillator and the frequency response of the low pass filter in a type CA1391 oscillator are primarily determined by external timing components, as shown in FIG. 3. Accordingly, LPF 63 is shown by dashed lines.

The $2f_H$-REF is one input to phase comparator 64. The error control signal of phase comparator 64 on line 65 is an input to low pass filter 63. The output of low pass filter 63 is a control input to voltage controlled oscillator 66, which operates at a $2f_H$ rate, and is denoted $2f_H$ VCO. The frequency characteristic of the low pass filter 63 is determined by an external series R-C network formed, for example, by 1.5 microfarad capacitor C53 and 2K resistor R68 as shown in FIG. 3. The output of voltage controlled oscillator 66 on line 67 provides CORRECTED $2f_H$ synchronizing signals for a horizontal output circuit 68. The output of the horizontal output circuit 68 on line 69 provides a $2f_H$ signal in the form of $2f_H$ RETRACE pulses. The $2f_H$ RETRACE pulses are an input to ramp generator 70, which is subject to a manual phase delay by manual delay circuit 72. The output of ramp generator 70 on line 71 is AC coupled by capacitor C56 to the other input of phase comparator 64 by line 73.

A circuit schematic for a portion of the block diagram shown in FIG. 1 is shown in FIG. 3. The phase locked loop 62, as a type CA1391 circuit, includes an oscillator 66, phase detector 64, predriver 84, phase detector output driver 86 and $V_{cc}$ voltage regulator 87. The oscillator 66 is an RC type with terminal 7 used to control frequency. An external capacitor C51 is connected from terminal 7 to ground and charges through external resistance R62 coupled between terminals 6 and 7. When the voltage at terminal 7 exceeds an internal potential bias, capacitor C51 is discharged through an internal resistor. This conduction causes generation of a drive pulse, which terminates when the capacitor is sufficiently discharged. Negative-going synchronizing pulses at terminal 3 are phase compared with the sawtooth waveform at terminal 4, which is derived from horizontal flyback or retrace pulses. If there is no phase difference between the synchronizing signal and the sawtooth waveform, there is no net output current at terminal 5. When a phase offset occurs, current flows either in or out of terminal 5 to correct the frequency. The duty cycle, or mark space ratio, of the predriver 84 may be adjusted by setting the potential at terminal 8. In the circuit of FIG. 3, this is determined by the voltage divider formed by resistors R63 and R64. Potentiometer R37, coupled to terminal 7 through resistor R72, may be used to manually adjust the frequency of oscillator 66.

The ramp generating circuit 70 comprises transistor Q4, resistor R55 and capacitor C50. The ramp signal generated across capacitor C50 is AC coupled to terminal 4 through capacitor C56. A transistor Q2 and potentiometer R20 form a manually operable delay circuit 72, which varies the current charging the ramp capacitor. Variation of the time needed to charge capacitor C50 provides a variable delay of approximately from 0–2 microseconds in the relative phase of the $2f_H$-REF pulses and the CORRECTED $2f_H$ pulses.

The CORRECTED $2f_H$ output of predriver 84 on line 67 is an input to a push-pull driver circuit comprising transistors Q5 and Q6, which provides a $2f_H$ DRIVE output signal to the horizontal output circuit.

Figure 4:
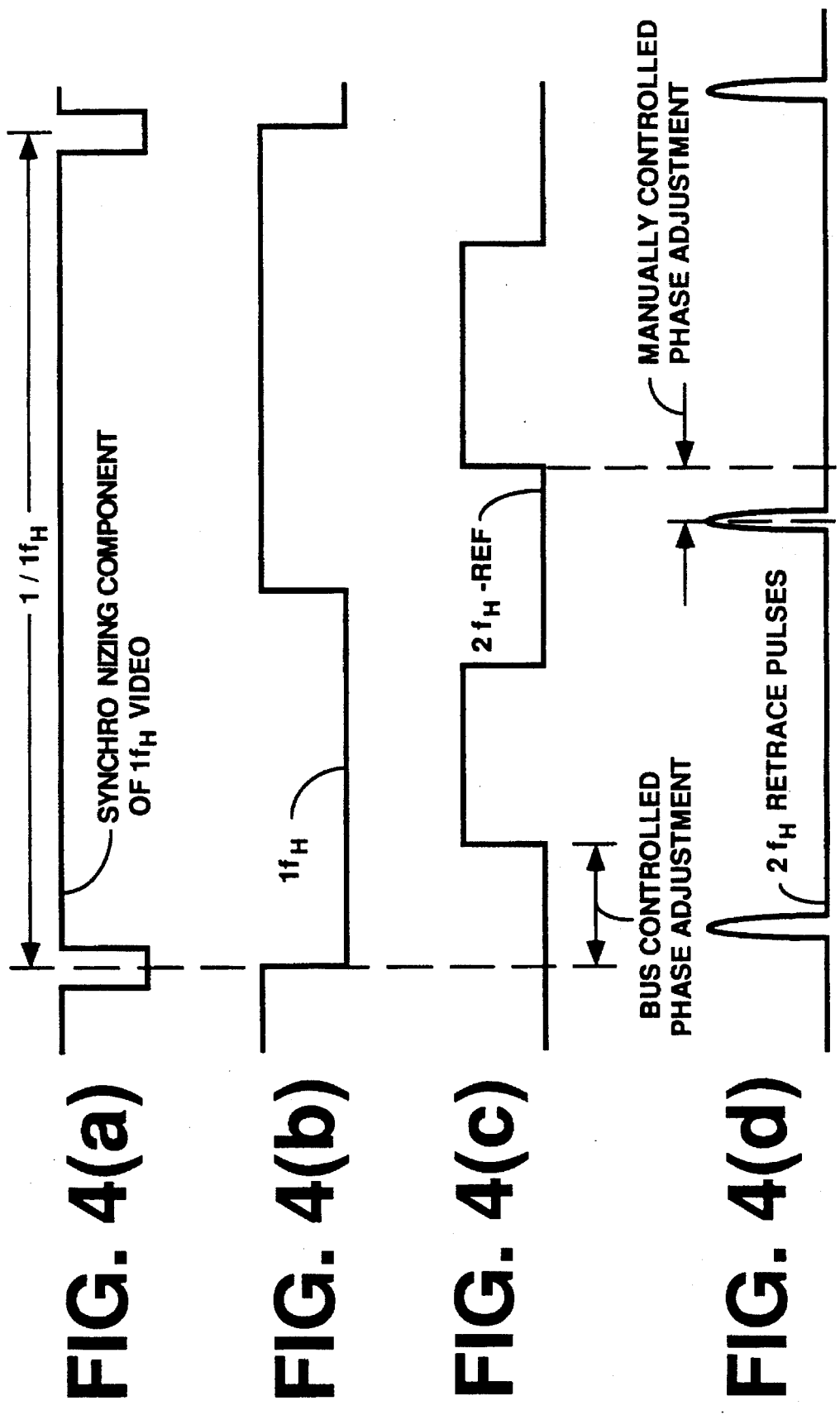

The waveforms of FIGS. 4(a), 4(b), 4(c) and 4(d) illustrate the relative phase positions of the $1f_H$ and $2f_H$ timing signals and synchronizing signals generated by operation of the circuit shown in FIG. 1, 2 and 3. FIG. 4(a) illustrates the $1f_H$ SYNC pulses separated by sync separator 14 and provided to phase comparator 16 on line 13. FIG. 4(b) shows the $1f_H$ output of the divide by 32 circuit 52 on line 17. The first phase locked loop is responsible for maintaining the relative phase of the leading edge, for example, of the $1f_H$ pulses at the midpoint, for example, of the $1f_H$ SYNC pulses. FIG. 4(c) illustrates the $2f_H$-REF signal generated by pulse width circuit 60 on line 61, which is one of the inputs to phase comparator 64 of the second phase locked loop 62. FIG. 4(d) is the $2f_H$ RETRACE signal on line 69, which is an input to the ramp generator 70. The difference in phase between the $1f_H$ SYNC pulses and the $2f_H$-REF pulses, and therefore the CORRECTED $2f_H$ pulses, is adjustable, for example in two microsecond steps as explained above, by bus control presetting of divide by 16 counter 58. Fine adjustment, for example from 0 to 2 microseconds, is provided by manually operable delay circuit 72, which provides for setting the phase difference between the $2f_H$ RETRACE PULSES and the $2f_H$-REF signal. The adjustment is indirect, as the manual control circuit actually adjusts the delay between the $2f_H$ RETRACE pulses and the sawtooth signal which is the other input to phase comparator 64. It will be appreciated that bus control with different time delay steps can be implemented by using different clock frequencies and/or different counters having different numbers of bits to provide different resolution. The manual phase adjustment can be modified to enable manual adjustment over a range corresponding to the incremental time delay steps provided by bus control.

An example of adjusting the video/raster phase delay to accommodate alternative video sources is shown in the block diagram of FIG. 7. The circuit 80 depicted in FIG. 7 is similar to the circuit 40 shown in FIGS. 1–3, except that alternative video sources and means for switching between the alternative video sources is also illustrated. The details of the 1-chip 12, the converter 56 and the second phase locked loop 62 are omitted for clarity, but may be as shown in FIGS. 1–3. Video source selector switches are features of some, but not all 1-chips.

The microprocessor 74 is coupled to a remote control receiver 86 and to a video source selector 88, for example by the serial bus 53. The remote receiver 86 is coupled to a keypad, for example a remote control keypad 84, by a radio or infrared transmission 85. Video source A, illustrated in block 81 as a composite video signal, is coupled to a separation and demodulation circuit 83. Video source A may therefore represent a broadcast or cablecast composite video signal, for example a $1f_H$ interlaced video signal. The outputs of the separation and demodulation circuit 83 are drive signals for the video guns, designated A RED, A GREEN and A BLUE, and a synchronizing signal, designated A SYNC. These outputs form one set of inputs to the video source selector 88. The other set of inputs to video source selector 88 are supplied by an alternate video source, which is illustrated in block 82 as an RGB video source. An RGB video source may be supplied, for example, by a computer. The outputs of the alternative video source 82 are designated RGB RED, RGB GREEN, RGB BLUE and RGB SYNC. It will be appreciated that a different delay in video/raster phasing may be necessary to assure proper centering of the picture. The video source selector 88 has outputs designated RED OUT, GREEN OUT, BLUE OUT and SYNC OUT. It is presumed, for purposes of illustration, that the timing signals of the alternative video sources are sufficiently different that, in the absence of a video/raster phase adjustment, the picture may not be properly centered horizontally when selecting the alternate video source.

Selection of an alternative video source, for example by means of a remote control keypad 84, is detected by remote receiver 86, and monitored by microprocessor 74. Microprocessor 74 sends control data to the video source selector 88 to provide the video drive signals and synchronizing signal form the alternative video source instead of video source A. Microprocessor 74 also transmits control data to the phase adjustment circuit in block 56, to compensate for the different timing of the alternative video source, to assure that the picture will be horizontally centered.

In accordance with an aspect of the invention, an optimum phase relationship can therefore be established between the incoming video signal and the scan synchronizing signal utilized by the horizontal deflection circuit to generate the raster. The optimum phase relationship can be achieved by utilizing both the bus controlled and manually controlled phase adjustment circuits for coarse and fine phase adjustments, respectively. It will be appreciated that coarse and fine are relative terms. The coarse adjustment can be made sufficiently fine, for a particular purpose, by decreasing the time delay of each incremental step. Whenever the microprocessor is called upon to initiate a special video display function or process, or to display an alternative video source, requiring more or less phase delay between the video signal and the scan synchronizing signal, the phase delay can be changed accordingly by the microprocessor. This arrangement provides the maximum flexibility for optimizing the video/raster phase delay for all video processes and all video sources.

What is claimed is:

1. A horizontal deflection system for adjusting and maintaining a phase relationship between a video signal and a scan synchronizing signal, comprising:

means for generating a first timing signal at a first frequency corresponding to a horizontal synchronizing component in a video signal and synchronously with said horizontal synchronizing component;

counting means operating synchronously with said first timing signal for generating a second timing signal at a second frequency greater than said first frequency;

means for supplying different numbers to said counting means for incrementally adjusting the relative phase between said first and second timing signals to control horizontal picture centering in different modes of operation; and, means responsive to said second timing signal for generating a scan synchronizing signal at said second frequency.

2. The system of claim 1, wherein said counting means comprises means for dividing a clock signal to generate said second timing signal.

3. The system of claim 1, wherein said different numbers are supplied to said counting means from a remote source.

4. The system of claim 1, further comprising a microprocessor for supplying said different numbers and a data bus for interconnecting said microprocessor and said counting means.

5. The system of claim 1, wherein said means for generating said first timing signal comprises:

means for generating a clock signal at a multiple of said first frequency; and, second counting means for dividing said clock signal by said multiple to generate said first timing signal.

6. The system of claim 5, wherein said clock signal generating means and said second counting means form part of a first phase locked loop, having said synchronizing component of said video signal as an input and said first timing signal as an output.

7. The system of claim 1, further comprising means for detecting edges of pulses in said first timing signal and generating a control signal for said counting means for synchronizing said counting means with said first timing signal.

8. The system of claim 1, wherein said supplying means comprises a shift register having an output coupled to said counting means and an input coupled to a source of said different numbers.

9. The system of claim 1, wherein said means for generating said scan synchronizing signal comprises a phase locked loop.

10. The system of claim 1, further comprising means for adjusting the relative phase between said second timing signal and said scan synchronizing signal.

11. A horizontal deflection system for controlling a phase relationship between a video signal and a scan synchronizing signal, comprising:

means for generating a clock signal at a clock frequency related to a horizontal synchronizing component of a video signal;

first counting means for dividing said clock signal by a first factor to generate a first timing signal at a first frequency;

second counting means, operating synchronously with said first counting means, for dividing said clock signal by a second factor to generate a second timing signal at a second frequency different from said first frequency;

means for supplying different starting numbers to said second counting means for adjusting the relative phase between said first and second timing signals to control horizontal picture centering; and, means for synchronously generating a scan synchronizing signal from said second timing signal.

12. The system of claim 11, wherein said second counting means is coupled to a remote source of said starting numbers.

13. The system of claim 12, further comprising a data bus for coupling said second counting means to a microprocessor, said microprocessor supplying said starting numbers.

14. The system of claim 11, further comprising means for adjusting the relative phase between said second timing signal and said scan synchronizing signal.

15. The system of claim 14, wherein said means for adjusting the relative phase between said second timing signal and said scan synchronizing signal is manually operable.

16. A horizontal deflection system for a television having at least two different video signal processing arrangements, comprising:

first generating means for generating an $f_H$ timing signal synchronously with an $f_H$ horizontal synchronizing component of a video signal;

counting means, operating synchronously with said first generating means, for generating a $2f_H$ timing signal;

a source of different numbers required to control horizontal picture centering for at least two different video signal processing arrangements;

first phase control means coupled for supplying one of said different numbers to said counting means for adjusting the phase between said $f_H$ and $2f_H$ timing signals to control horizontal picture centering;

second generating means, operating synchronously with said $2f_H$ timing signal, for generating a $2f_H$ scan synchronizing signal; and, second phase control means coupled to said second generating means for adjusting the relative phase between said $2f_H$ timing signal and said $2f_H$ scan synchronizing signal.

17. The system of claim 16, wherein said first phase control means is coupled to a data bus for receiving said different numbers.

18. The system of claim 16, wherein said second phase control means is coupled to manually operable means.

19. The system of claim 16, wherein said first and second generating means comprise first and second phase locked loops respectively.

20. The system of claim 16, wherein:

said counting means divides a clock signal synchronously with said $f_H$ timing signal to generate said $2f_H$ timing signal; and, said different numbers are used for presetting said counting means.

21. The system of claim 20, wherein said first phase control means further comprises a shift register having an output coupled to said counting means for supplying said different numbers and an input coupled to a remote source of said different numbers.

22. The system of claim 21, further comprising a data bus for coupling said counting means to a microprocessor, said microprocessor supplying said different numbers to said shift register.

23. A horizontal deflection system having a phase control circuit for setting a phase relationship between a noninterlaced $2f_H$ scan synchronizing signal and a horizontal synchronizing component of an interlaced $1f_H$ video signal, comprising:

first clock means for generating an $nf_H$ timing signal, where $f_H$ is a horizontal scanning frequency and n is an integer;

a divide by n circuit for generating a $1f_H$ timing signal from said $nf_H$ timing signal;

a first phase locked loop including said first clock means for synchronizing said $1f_H$ timing signal with said synchronizing component of said video signal;

a presettable divide by n/2 counting circuit operating synchronously with said $1f_H$ timing signal for generating a $2f_H$ timing signal from said $nf_H$ timing signal;

means for supplying different numbers to said n/2 counting circuit for incrementally adjusting a delay between said $1f_H$ timing signal and said $2f_H$ timing signal; and, means operating synchronously with said second timing signal and for generating a $2f_H$ scan synchronizing signal.

24. The system of claim 23, comprising a data bus for transmitting said numbers to said counting circuit.

25. The system of claim 23, comprising a register for storing said numbers.

26. The system of claim 23, comprising means for decoding a predetermined output count of said counting circuit as said $2f_H$ timing signal.

27. The system of claim 23, comprising manually operable means for adjusting a delay between said $2f_H$ timing signal and said $2f_H$ scan synchronizing signal.

28. The system of claim 23, comprising:

a phase locked loop operating synchronously with said second timing signal and having a controllable oscillator for generating said $2f_H$ scan synchronizing signal; and, manually operable means for adjusting a delay between said $2f_H$ timing signal and said $2f_H$ scan synchronizing signal, coupled in a feedback path of said phase locked loop.

29. A horizontal centering circuit for video signals from alternative video sources, comprising:

first and second video sources for video signals and respective horizontal synchronizing components;

means coupled to said video sources for selecting a video signal and its respective horizontal synchronizing component from one of said first and second video sources as an output;

presettable dividing means operable synchronously with a horizontal synchronizing component of a selected video signal for generating a timing signal, said timing signal having an adjustable phase delay relative to said synchronizing component depending upon presetting of said dividing means; and, control means for operating said video signal selecting means and for presetting said dividing means by a number appropriate for said selected video signal.

30. The circuit of claim 29, wherein said timing signal is a scan synchronizing signal.

31. The circuit of claim 29, comprising means for synchronously generating a scan synchronizing signal from said timing signal.

32. The circuit of claim 29, wherein said control means comprises:

a microprocessor;

a video source selection switch; and, a communications and control bus for interconnecting said microprocessor, said video source selection switch, said selecting means and said means for synchronously generating said timing signal.

33. The circuit of claim 32, wherein said means for synchronously generating said timing signal comprises counting means for dividing a clock signal to generate said timing signal, said counting means having a preloadable input for receiving different numbers from said microprocessor to adjust said relative phase delay.

* * * * *